United States Patent Office 3,200,140
Patented Aug. 10, 1965

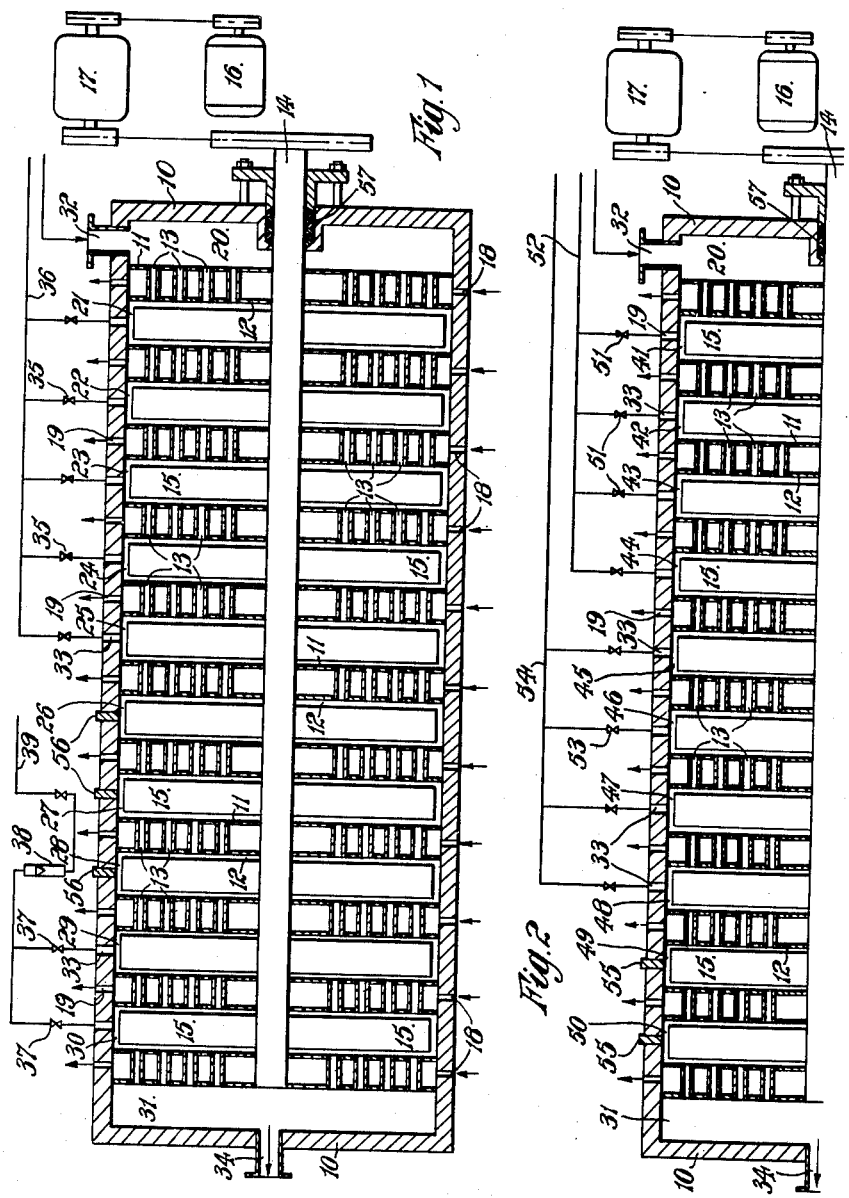

3,200,140
MANUFACTURE OF SULPHATED FATTY ALCOHOLS AND SULPHONATED ALKYL PHENYLS
Austen Edgar Sowerby, Howgate, Whitehaven, Cumberland, England, assignor, by mesne assignments, to Marchon Products Limited, Whitehaven, Cumberland, England, a British company
Filed Apr. 24, 1962, Ser. No. 189,745
Claims priority, application Great Britain, Apr. 25, 1961, 14,906/61; Jan. 25, 1962, 2,836/62
24 Claims. (Cl. 260—459)

This invention relates to the sulphation of fatty alcohols and certain derivatives thereof, and to the sulphonation of alkaryl hydrocarbons. The derivatives of fatty alcohols to which the invention may be applied are those containing hydroxyl groups, for example glycol ethers, and the term "fatty alcohols" as used hereinafter is to be construed, where the context permits, as including derivatives thereof containing hydroxyl groups, and also mixtures of alcohols with each other and with hydroxyl-containing derivatives thereof. Likewise the term "alkaryl hydrocarbon" includes, where the context permits, mixtures of such hydrocarbons.

The sulphation of saturated fatty alcohols such as lauryl alcohol and sulphonation of mononuclear alkaryl hydrocarbons such as dodecyl benzene have hitherto been carried out by reacting the alcohol or hydrocarbon with sulphuric acid, chlorosulphonic acid or oleum. It has been proposed to sulphonate alkaryl hydrocarbons by means of sulphur trioxide, the reaction taking place in solution in liquid sulphur dioxide in a multi-compartment vessel and the sulphur trioxide being introduced separately into the compartments so that a deficiency thereof is present until the last stage of the reaction. It has also been proposed to sulphate or sulphonate organic liquids with sulphur trioxide introduced into the liquid in admixture with an inert gas so that the molecular ratio of sulphur trioxide to organic liquid is between 1:1 and 1.5:1.

In the case of the first of these proposals it was considered necessary, in order to overcome the difficulty of mixing the gaseous and liquid reactants and to achieve adequate cooling, to go to the complication of operating in liquid sulphur dioxide. We have found, however, that a satisfactory product can be obtained according to our invention by the following process; a mixture of sulphur trioxide with a diluent which is inert and gaseous in the conditions of the reaction is introduced into and intimately mixed with a liquid mass containing the saturated fatty alcohol, e.g. lauryl alcohol, or mononuclear hydrocarbon, e.g. dodecyl benzene, flowing continuously through a reaction vessel such that at least two zones are established in the flow path of the liquid, the rate of introduction of the gas mixture relative to the mass flow rate of the alcohol or hydrocarbon being such that the molecular ratio of sulphur trioxide to alcohol or hydrocarbon is substantially less than 1 in the first zone or zones but greater than 1 in the last zone or zones, and that the volume of the gas mixture is at least several hundred times the volume of the liquid in the reactor, and the mean gas/liquid residence time in the last zone or zones being less than 1 second, whereupon the reaction is terminated by degassing the reaction mixture or by quenching it in water in the case of hydrocarbons or by neutralisation in the case of alcohols.

The invention is of especial importance in its application to raw materials for use in making detergents, particularly fatty alcohols which either are heat-sensitive by virtue of their chemical constitution, for example glycol ethers of fatty alcohols, or have a high melting point, for example above 30° C. In the latter category are those fatty alcohols themselves which have more than 8 carbon atoms, particularly saturated fatty alcohols such as lauryl alcohol, for instance 16 to 18 carbon atoms. It is particularly difficult to obtain a product of satisfactory colour from such alcohols, but we have found that this can be achieved if the addition of the gaseous sulphur trioxide mixture is carried out in several zones, for example ten or more, the sulphur trioxide being present in excess only in the last few, e.g. the last two or three zones. The best results are obtained if the sulphur trioxide mixture is not introduced into one or two final zones of the reaction, the sulphur trioxide in this zone or zones being only that which is carried over from the previous zones. The latter zones may in this case be referred to as "maturing" zones although in fact completion of the reaction takes place in them.

The inert gas with which the sulphur trioxide is mixed may be any readily available gas which is inert and gaseous in the conditions of the reaction. Thus, for example, air may be used. The proportion of sulphur trioxide to inert gas may preferably be in the range 1–10%, for example 5%.

According to a feature of the invention, the temperature of the reaction mixture may be controlled in each zone of sulphur trioxide addition to a value just above, e.g., not more than 10° C. or preferably not more than 2° C. above the melting point of the mixture in that zone. To achieve the required temperature control in the rapidly flowing mixture, a high ratio of heat-exchange surface to volume of reactor is necessary. For this purpose there may be used a vessel divided into zones by partitions, baffles or the like, into each or some of which the gas containing sulphur trioxide is introduced, and each of which is maintained at the required temperature as described in our copending patent application No. 189,746 filed April 24, 1962. The ratio of the area of the heat exchange surface to volume of reactor in such a reactor is unusually high, for example of the order of 30 sq. ft.:1 cu. ft.

Provided the proportion of sulphur trioxide is less than stoichiometric in the early zones of the reaction and greater than stoichiometric in the later zones, it is not necessary to meter the gas supply with great accuracy. The excess of sulphur trioxide in the last zone or zones may advantageously be 2% molar or a little greater, but owing to the extremely short residence time in this zone or zones, a higher excess, e.g., up to 10%, can easily be tolerated and may indeed be advantageous to achieve a higher degree of conversion. The preferred proportion of sulphur trioxide to raw material in the early zones of the reaction increases progressively from about 15–25% in the first such zone to about 90% in the last such zone.

It is preferred that the rates of sulphur trioxide addition in the several zones be such that the reaction proceeds to about 90% of completion in the absence of an excess of sulphur trioxide, while the remainder of the reaction, for example to about 98–99% of completion, takes place with a slight excess of sulphur trioxide. Immediately thereafter the reaction is terminated by degassing, quenching or neutralising the reaction mixture according to the circumstances. If neutralisation is not carried out at this stage, it will generally be necessary later, for example if the final product is to be used as a detergent. If it is desired to minimise the quantity of alkali metal sulphate in the final product, the termination of the reaction between the sulphur trioxide and the raw material, whether it be an alcohol or a hydrocarbon, should be effected by rapid degassing to remove the excess of gaseous sulphur trioxide with the inert gas. This degassing may conveniently be carried out in a vacuum cylcone.

If, on the other hand, the presence of alkali metal sulphate in the final product is not a disadvantage, the reaction with sulphur trioxide may more conveniently be terminated by quenching the product in water in the case of sulphonated alkaryl hydrocarbons, or by neutralisation in an aqueous alkali in the case of sulphated alcohols.

Where a neutral product is required, and the termination of the sulphonation or sulphation reaction has not involved neutralisation, the product of the degasification or quenching process is neutralised at leisure in an aqueous alkali.

The residence time of the reactants in the last zones in which there is an excess of sulphur trioxide is critical. As stated above, the mean gas/liquid residence time in these zones is less than 1 second, but preferably may be as small as 0.1 second. The residence time in the earlier zones is not critical, but advantageously the residence time for the whole reaction is less than 2 seconds. Preferably also the overall time from the beginning of the reaction to the end of the terminal process of degassing, neutralisation or quenching is less than 4 seconds.

It is an advantage of the process according to the invention that since the sulphur trioxide is greatly diluted by the inert gas, and the mixture enters the reactor at each zone, or at least at each of the earlier zones, the concentration of sulphur trioxide in the gas mixture in the last zones, at which the substantially completely reacted product is most sensitive, is considerably reduced. Moreover since the volume of the gas mixture is much larger than that of the liquid, e.g. of the order of 1000 times as great, the residence time of the gas/liquid mixture decreases from one zone to the next, and is therefore smallest where the liquid mixture is most sensitive.

If desired the raw material fed into the reactor may contain a proportion of already sulphated or sulphonated product.

It is possible using the invention to effect a good control of the process. This is due to the fact that the volume and the residence time of the reaction mixture at any stage of the process are small, so that a control signal derived from a sample taken at any desired point in the flow path of the reactants and fed back to the parameter or parameters to be controlled becomes effective (after a small time lag) on the whole volume of reaction mixture. The property of the sample of reaction mixture to be measured may be the viscosity or the specific gravity of the liquid after removal of the gas entrained therein.

The apparatus for carrying out the invention may advantageously be as described in our aforesaid patent application. This has the important characteristic of a large area of cooling surface in relation to the volume of the reaction space. In addition to enabling more rapid and uniform cooling to be effected, this characteristic has the further advantage that for a given degree of cooling, a warmer cooling medium may be used, thus reducing the tendency for a solid insulating film of the raw material to be deposited on the heat-exchange surfaces.

Instead of the apparatus just referred to, any other apparatus may be used in which (a) the liquid raw material can be made to flow through a number of chambers or partitioned zones of a vessel, (b) the sulphur trioxide gas mixture can be introduced at predetermined rates into each chamber or zone, (c) the liquid and gas phases are intimately mixed throughout, (d) cooling means are provided for controlling the temperature of the reaction mixture to a predetermined value in each chamber or zone, (e) the area of the cooling surface is large in relation to the volume of the reaction space. An example of apparatus fulfilling these requirements comprises a series of reaction chambers joined by injector pumps in which the injector gas is the sulphur trioxide gas mixture, the requisite cooling being effected as the reaction mixture flows between the successive injector nozzles. Instead of a series of injectors, any other suitable kind of multi-stage pump may be used.

Examples of a sulphonation and sulphation reaction according to the invention will now be described with reference to the accompanying drawing in which FIG. 1 is a diagrammatic sectional elevation of a reactor for the sulphonation of alkyl benzenes, and FIG. 2 is a similar view of the upper portion of a reactor for the sulphation of fatty alcohols.

Referring to FIG. 1, the reactor 10 is cylindrical in shape and is divided into twelve chambers by eleven hollow baffle plates, each of which consists of parallel perforated plates 11 and 12 and a plurality of tubes 13 welded into the perforations. A shaft 14 journalled in bearings 57 passes through all the plates 11 and 12, liquid-tight seals (not shown) being provided at each plate. Fixed on the shaft 14 are agitator blades 15, each of which is situated with a small clearance between adjacent hollow baffle plates. The shaft 14 is driven by a motor 16 through a variable speed gear box 17.

Each hollow baffle plate is provided with an inlet 18 and an outlet 19 each inlet and outlet being connected in an independent circuit (not shown) for the circulation of a cooling fluid, in the present case water.

The chambers into which the reactor is divided by the hollow baffle plates 11, 12, 13 comprise an inlet chamber 20, reaction chambers 21, 22, 23, 24, 25, 26, 27, and 28, quenching chambers 29 and 30 and an exit chamber 31. The inlet chamber 20 is provided with an inlet pipe 32 for the raw material to be sulphonated, in the present example dodecyl benzene. Each of chambers 21-30 is provided with a plurality of inlets such as 33 distributed round the circumference of the reactor wall. The exit chamber is provided with an outlet pipe 34 for the reaction product: dodecyl benzene sulphonate.

The inlets 33 of chambers 21–25 are connected via cocks 35 with a pipe 36 for the supply of a mixture of sulphur trioxide and dry air. The inlets 33 of chambers 26–28 are closed by plugs 56. The inlets 33 of chambers 29 and 30 are connected via cocks 37 and a rotameter 38 with a pipe 39 for the supply of quenching water.

The operation of the reactor shown in FIG. 1 will be described below under "Example 1."

Referring now to FIG. 2, like parts of which are denoted by the same reference numerals as those of FIG. 1, the hollow baffle plates 11, 12, 13 again divide the reactor 10 into twelve chambers. The latter comprise an inlet chamber 20, an exit chamber 31 and ten chambers 41–50. The fatty alcohol, in the present example lauryl alcohol, is supplied to chamber 20 by pipe 32, and the sulphated product is withdrawn from the exit chamber 31 by pipe 34.

The inlets 33 of chambers 41–44 are connected via cocks 51 with a pipe 52 for the supply of a certain mixture of sulphur trioxide and air. Inlets 33 of chambers 45–48 are connected via cocks 53 with a pipe 54 for the supply of a different sulphur trioxide/air mixture. Inlets 33 of chambers 49 and 50 are closed by plugs 55.

The operation of the reactor shown in FIG. 2 will be described below under "Example 2."

The invention is illustrated by the following examples:

*Example 1*

Dodecyl benzene was continuously supplied to the inlet chamber of the reactor shown in FIG. 1 at a rate of 200 lb. per hour by means of a proportioning pump, and passed, via the passages in the first hollow baffle plate, into the first reaction chamber No. 21. A gas stream containing 5% by volume of sulphur trioxide vapour and 95% of dry air was delivered to entry ports in the reaction chambers Nos. 21-25 at the rate of 7200 standard cubic feet per hour by means of a rotary compressor. The alkyl benzene, passing successively through each reaction chamber became progressively sulphonated, the ratio of sulphur trioxide to raw material increasing as the raw material was used up.

From reaction chamber No. 25, the reaction mixture passed into reaction chambers Nos. 26–28 (herein referred to as "maturing chambers") where absorption of sulphur trioxide from the carrier gas stream continued, thus reducing the content of un-sulphonated alkyl benzene in the reaction mixture to a low value. In this zone, cooling water was circulated through the baffle plates to reduce the reaction temperatures to 55°–60° C.

From the final maturing chamber, in which reaction was substantially complete, the reaction product, dodecyl benzene sulphonate, passed into the chambers Nos. 29 and 30 where it was intimately mixed with water supplied to these chambers at the rate of ½ gallon per hour by means of a proportioning pump. In this way any unreacted sulphur trioxide which may be present was destroyed. In this zone, the flow rate of the heat-exchange fluid was so regulated that the heat of dilution was removed and the temperature of the reaction mixture was 60°–65° C.

The mixture of carrier gas and dodecyl benzene sulphonate which issued from the exit chamber was fed directly into a neutralisation vessel where it was neutralised by aqueous alkali.

The reaction product was a white paste and had the following composition:

|   | Percent |
|---|---|
| Sodium dodecyl benzene sulphonate | 43.2 |
| Unsulphonated oil | 1 |
| Sodium sulphate | 1 |
| Water | 55.46 |

*Example 2*

Commercial lauryl alcohol was continuously supplied to the inlet chamber of the reactor shown in FIG. 2 at a rate of 180 lb. per hour. A carrier gas stream containing 5% by volumn of sulphur trioxide vapour and 95% of dry air was delivered at the rate of 5000 standard cubic feet per hour to reaction chambers Nos. 41–44 and a stream containing 2% by volume of sulphur trioxide vapour and 98% of dry air was delivered at the rate of 5500 standard cubic feet per hour to reaction chambers Nos. 45–48. The reactants flowed through the reaction vessel as described in Example 1.

About 70% of the lauryl alcohol was converted to lauryl sulphate in reaction chambers Nos. 41–44 and in reaction chamber No. 48 conversion to lauryl sulphate was nearly complete.

From the final reaction chamber No. 48 the lauryl sulphate passed into the reaction chambers Nos. 49 and 50 (herein referred to as "maturing chambers") where the temperature was reduced to 20°–22° C. at which temperature chemical and colour degradations of the lauryl sulphate were minimised.

The mixture of carrier gas and lauryl sulphate which issued from the exit chamber was passed into a continuous separator wherein the gaseous components were separated and led to an absorption tower. The liquid reaction product which issued from the separation was then neutralized with aqueous alkali. The reaction product was a pale yellow liquid containing approximately:

|   | Percent |
|---|---|
| Sodium lauryl sulphate | 19.3 |
| Unsulphated fatty acohols | 0.43 |
| Sodium sulphate | 0.98 |
| Water | 79.29 |

*Example 3*

Commercial lauryl alcohol was delivered by means of a metering pump and at a flow rate of 180 lbs. per hour to the first chamber of a multi chamber reactor similar to those shown in the accompanying drawings and comprising 10 reaction chambers separated from each other by hollow baffle plates serving as heat-exchanges, giving a total heat transfer surface of 10 sq. ft. Each chamber was provided with an agitator and chambers 1 to 8 were each provided with four gas injection ports. A convertor gas stream containing 5.6% by volume of sulphur trioxide was delivered by means of a rotary compressor at a rate of 7200 standard cubic feet per hour to a manifold from which it was fed at accurately metered flow rates to the injection ports of reaction chambers Nos. 1–8. The gas flow rates were adjusted in such a manner that 40% of the total gas volume entered chambers 1 and 2, and 10% of the total volume entered each of chambers 3 to 8. Reaction was about 90% complete in chamber No. 7. No sulphur trioxide was admitted to chambers 9 and 10 which were employed as maturing zones in which the reaction was carried to 98–99.5% conversion.

The reaction temperature in each chamber was carefully regulated by adjusting the flow rate of the cooling water passing through each of the heat transfer plates and the substantially completely reacted product emerged from chambers No. 10 at a temperature of 32° C. In this manner, therefore, the lauryl alcohol was sulphated progressively in successive reaction chambers with sulphur trioxide contained in a carrier gas stream. At the same time the concentration of the sulphur trioxide gas stream in successive reaction chambers was progressively reduced by means of the diluting effect of the carrier gas stream issuing from the preceding chamber or chambers. The mean gas/liquid residence time in successive chambers 1 to 8 was progressively reduced by virtue of the increase in the ratio of gas to liquid occurring in each chamber. Sulphur trioxide was present in proportions greater than stoichiometric in reaction chamber No. 8 and maturing chambers 9 and 10 only for a total residence time of about one-fifteenth of a second and the total residence time in the reactor was about 0.3 second.

The mixture of substantially completely reacted product, carrier gas and unreacted sulphur trioxide which emerged from the reactor was passed into a continuous separator wherein the gaseous components of the mixture were separated and passed to an absorption tower. The liquid acid end-product issuing from the separator was neutralised immediately in aqueous alkali to give an aqueous solution of sodium lauryl sulphate of exceptionally good colour and having the following composition:

|   | Percent |
|---|---|
| Sodium lauryl sulphate | 27.0 |
| Unsulphated alcohol | 0.21 |
| Sodium sulphate | 0.79 |
| Water | 72.0 |

*Example 4*

The equipment was identical with that described in Example 3. Commercial dodecyl benezene was delivered to the first chamber of the reactor at a controlled flow rate of 240 lbs. per hour and a gas stream containing 5.6% of sulphur trioxide was delivered to the distribution manifold at a controlled rate of 7200 standard cubic feet per hour. The gas distribution into successive reaction chambers and the mean gas/liquid residence times and sulphur trioxide concentrations therein were identical with those described in Example 3. The flow rate of the cooling water supplied to the heat-exchange plates was adjusted in order to control the temperature in each of the reaction and maturing chambers to a value in the range 50°–60° C., and the temperature of the substantially reacted alkyl benzene emerging from chamber No. 10 was about 55° C. The mixture of liquid reaction product, carrier gas and unreacted sulphur trioxide which emerged from the reactor was passed into a continuous separator wherein the gaseous components were separated and led to an absorption tower. The liquid dodecyl benzene sulphonic acid emerging from the separator passed into a receiving tank wherein a small amount of water was introduced to quench the reaction and prevent colour deterioration under storage conditions. The dodecyl benzene sulphonate produced in this manner was of exceptionally good colour and had the following composition:

| | Percent |
|---|---|
| Dodecyl benzene sulphonic acid | 96.2 |
| Unsulphonated oil | 0.97 |
| Free sulphuric acid | 2.12 |
| Water | 0.7 |

The conditions obtaining in the reaction chambers in the foregoing examples are set out in the following table:

| Example | Chamber No. | SO₃ Carrier Gas Concentration, Percent | SO₃: Raw Material, Percent of Stoichiometric | Residence Time, Secs./100 | Temperature, °C. |
|---|---|---|---|---|---|
| 1 | 1 | 5 | 22.7 | 8 | 30 |
| | 2 | 2.5 | 45.4 | 4 | 44 |
| | 3 | 1.66 | 68.1 | 3 | 52 |
| | 4 | 1.25 | 88.8 | 2 | 61 |
| | 5 | 1.0 | 113.5 | 1.5 | 70 |
| | 6 | } 0.61 | 113.5 | 1.5 | 55-60 |
| | 7 | | 113.5 | 1.5 | 55-60 |
| | 8 | | 113.5 | 1.5 | 55-60 |
| Total | | | | 23.0 | |
| 2 | 1 | 5 | 17.5 | 9 | 35 |
| | 2 | 2.5 | 35 | 5 | 40 |
| | 3 | 1.66 | 52.5 | 3 | 45 |
| | 4 | 1.25 | 70.0 | 2 | 30 |
| | 5 | 0.433 | 77.5 | 2 | 25 |
| | 6 | 0.355 | 85 | 1.5 | 22 |
| | 7 | 0.30 | 92.5 | 1 | 24 |
| | 8 | 0.262 | 101 | 1 | 25 |
| | 9 | 0.15 | 101 | 1 | 22 |
| | 10 | 0.1 | 101 | 1 | 21 |
| Total | | | | 26.5 | |
| 3 | 1 | 5.6 | 22.2 | 8 | 39 |
| | 2 | 2.8 | 44.4 | 4 | 45 |
| | 3 | 1.12 | 55.2 | 3 | 40 |
| | 4 | 0.83 | 66.25 | 2.5 | 38 |
| | 5 | 0.8 | 77.5 | 2 | 39 |
| | 6 | 0.7 | 88.5 | 2 | 38 |
| | 7 | 0.62 | 99.5 | 2 | 37 |
| | 8 | 0.56 | 111 | 1.5 | 38 |
| | 9 | 0.56 | 111 | 1.5 | 35 |
| | 10 | 0.56 | 111 | 1.5 | 32 |
| Total | | | | 28.0 | |
| 4 | 1 | 5.6 | 22.8 | 8 | 50-60 |
| | 2 | 2.8 | 45.5 | 4 | 50-60 |
| | 3 | 1.12 | 56.8 | 3 | 50-60 |
| | 4 | 0.93 | 67.3 | 2.5 | 50-60 |
| | 5 | 0.8 | 79.8 | 2 | 50-60 |
| | 6 | 0.7 | 90.8 | 2 | 50-60 |
| | 7 | 0.62 | 102 | 2 | 50-60 |
| | 8 | 0.56 | 114 | 1.5 | 50-60 |
| | 9 | 0.56 | 114 | 1.5 | 50-60 |
| | 10 | 0.56 | 114 | 1.5 | 50-60 |
| Total | | | | 28.0 | |

What I claim is:

1. A method of sulphating and sulphonating respectively a detergent raw material selected from the group consisting of saturated fatty alcohols and mononuclear alkaryl hydrocarbons which comprises continuously flowing a liquid mass containing said material through a reaction vessel partitioned to have at least two interconnecting reaction zones established in the flow path of the liquid, introducing into each of said zones a gaseous mixture of sulphur trioxide and a diluent which is inert and gaseous at the conditions of the reaction, said zones being controlled at a temperature just above the melting point of the reactants in the respective zones whereby the liquid flows freely through the zones, and intimately mixing said gas mixture with said liquid to react said sulphur trioxide and said material, said gas mixture being introduced into said liquid such that the molecular ratio of sulphur trioxide to said material is substantially less than 1 in the first of said zones and greater than 1 in the latter of said zones, the volume of said gas mixture being at least four hundred times the volume of said liquid in the reactor, the mean gas-liquid residence time in said latter zone being less than about 1 second, and thereafter terminating said reaction.

2. A process as defined in claim 1, wherein there are at least ten of said zones, said sulphur trioxide being present in excess in the last three zones.

3. The method of claim 1, wherein said temperature is not more than 10° C. above the melting point of the reactants in the respective zone.

4. The method of claim 1, wherein said temperature is not more than 2° C. above the melting point of the reactants in the respective zone.

5. A method as defined in claim 1, wherein the excess of sulphur trioxide in the last zone is less than about 10% of the stoichiometric value and the deficiency of sulphur trioxide in the first zone is less than about 10% of the stoichiometric value.

6. The method of claim 1, wherein said gas mixture contains from about 1 to 10% sulphur trioxide.

7. The method of claim 1, wherein said gas mixture contains about 5% sulphur trioxide.

8. The method of claim 1, wherein said terminating process comprises degassing the reaction zones.

9. The method of claim 1, wherein said material is a mononuclear alkaryl hydrocarbon and said terminal process comprises quenching the reaction mixture with water.

10. The method of claim 1, wherein said material is a saturated fatty alcohol and said terminal process comprises neutralizing the reaction mixture.

11. A method as claimed in claim 2, wherein the excess of sulphur trioxide in the last zone is less than about 10% of the stoichiometric value.

12. A method as claimed in claim 2, wherein the deficiency of sulphur trioxide in the first zone is in the range of from about 50% to 5% of the stoichiometric value.

13. A method as claimed in claim 2, wherein the rates of sulphur trioxide addition in the zones are such that the reaction proceeds to about 90% of completion in the absence of an excess of sulphur trioxide, while the remainder of the reaction takes place with a slight excess of sulphur trioxide.

14. A method as claimed in claim 2, wherein the mean gas/liquid residence time in the zones in which there is an excess of sulphur trioxide is less than 0.1 second.

15. A method as claimed in claim 2, wherein the residence time of the reactants during the whole of the reaction with sulphur trioxide is less than about 2 seconds and the overall time from the beginning of the reaction to the end of the terminal process is less than about 4 seconds.

16. A method as claimed in claim 2, wherein the reaction is carried out in a reactor containing heat-exchange surfaces which divide the reactor into the aforesaid zones, and the ratio of the heat-exchange area to the volume of the reactor is of the order of about 30 sq. ft./1 cu. ft.

17. A method as claimed in claim 2, wherein the excess of sulphur trioxide in the last zone is less than about 10% of the stoichiometric value.

18. A method as claimed in claim 17, wherein the deficiency of sulphur trioxide in the first zone is in the range of from about 50% to 5% of the stoichiometric value.

19. A method as claimed in claim 17, wherein said gaseous mixture is introduced only into the zones in which there is a stoichiometric deficiency of sulphur trioxide.

20. A method of sulphating and sulphonating respectively a heat-sensitive saturated fatty alcohol having from about 8 to about 18 carbon atoms which comprises continuously flowing a liquid mass containing said alcohol through a reaction vessel partitioned to have at least two inter-connecting reaction zones established in the flow path of the liquid, introducing into each of said zones a gaseous mixture of sulphur trioxide and a diluent which is inert and gaseous at the conditions of the reaction, said zones being controlled at a temperature just above the melting point of the reactants in the respective zones whereby the liquid flows freely through the zones, and intimately mixing said gas mixture with said liquid to react said sulphur trioxide and said alcohol, said gas mixture being introduced into said liquid such that the molecular ratio of sulphur trioxide to said alcohol is substantially less than 1 in the first of said zones and greater than 1 in the latter of said zones, the volume of said gas mixture being at least four hundred times the volume of said liquid in the reactor, the mean gas-liquid residence time in said latter zone being less than about 1 second, and thereafter terminating said reaction.

21. A method of sulphonating a mononuclear alkaryl hydrocarbon which comprises continuously flowing a liquid mass containing said hydrocarbon through a reaction vessel partitioned to have at least two interconnecting reaction zones established in the flow path of the liquid, introducing into each of said zones a gaseous mixture of sulphur trioxide and a diluent which is inert and gaseous at the conditions of the reaction, said zones being controlled at a temperature just above the melting point of the reactants in the respective zones whereby the liquid flows freely through the zones, and intimately mixing said gas mixture with said liquid to react said sulphur trioxide and said hydrocarbon, said gas mixture being introduced into said liquid such that the molecular ratio of sulphur trioxide to said hydrocarbon is substantially less than 1 in the first of said zones and greater than 1 in the last of said zones, the volume of said gas mixture being at least four hundred times the volume of said liquid in the reactor, the mean gas-liquid residence time in said last zone being less than about 1 second, and thereafter terminating said reaction.

22. The method of claim 21, wherein said mononuclear alkaryl hydrocarbon is dodecyl benzene.

23. A method of sulphating a detergent raw material selected from the group consisting of saturated fatty alcohols having from about 8 to about 18 carbon atoms which comprises continuously flowing a liquid mass containing said material through a reaction vessel partitioned to have at least two inter-connecting reaction zones established in the flow path of the liquid, introducing into each of said zones a gaseous mixture of sulphur trioxide and a diluent which is inert and gaseous at the conditions of the reaction, said zones being controlled at a temperature just above the melting point of the reactants in the respective zones whereby the liquid flows freely through the zones, and intimately mixing said gas mixture with said liquid to react said sulphur trioxide and said material, said gas mixture being introduced into said liquid such that the molecular ratio of sulphur trioxide to said material is substantially less than 1 in the first of said zones and greater than 1 in the last of said zones, the volume of said gas mixture being at least four hundred times the volume of said liquid in the reactor, the mean gas-liquid residence time in said last zone being less than about 1 second, and thereafter terminating said reaction.

24. The method of claim 23, wherein said fatty alcohol is lauryl alcohol.

References Cited by the Examiner

UNITED STATES PATENTS

| | | | |
|---|---|---|---|
| 2,235,098 | 3/41 | Brandt et al. | 260—459 X |
| 2,616,936 | 11/52 | Mammen et al. | 260—459 X |
| 2,691,040 | 10/54 | Bloch et al. | 260—505 |
| 2,697,031 | 12/54 | Hervert | 260—459 X |
| 2,768,199 | 10/56 | Luntz et al. | 260—505 |
| 2,863,912 | 12/58 | Smith | 260—505 |
| 2,923,728 | 2/60 | Falk et al. | 260—459 |

FOREIGN PATENTS

| | | |
|---|---|---|
| 592,329 | 2/60 | Canada. |
| 791,995 | 3/58 | Great Britain. |
| 808,394 | 2/59 | Great Britain. |

CHARLES B. PARKER, *Primary Examiner.*

JOSEPH P. BRUST, *Examiner.*